United States Patent Office 2,766,845
Patented Oct. 16, 1956

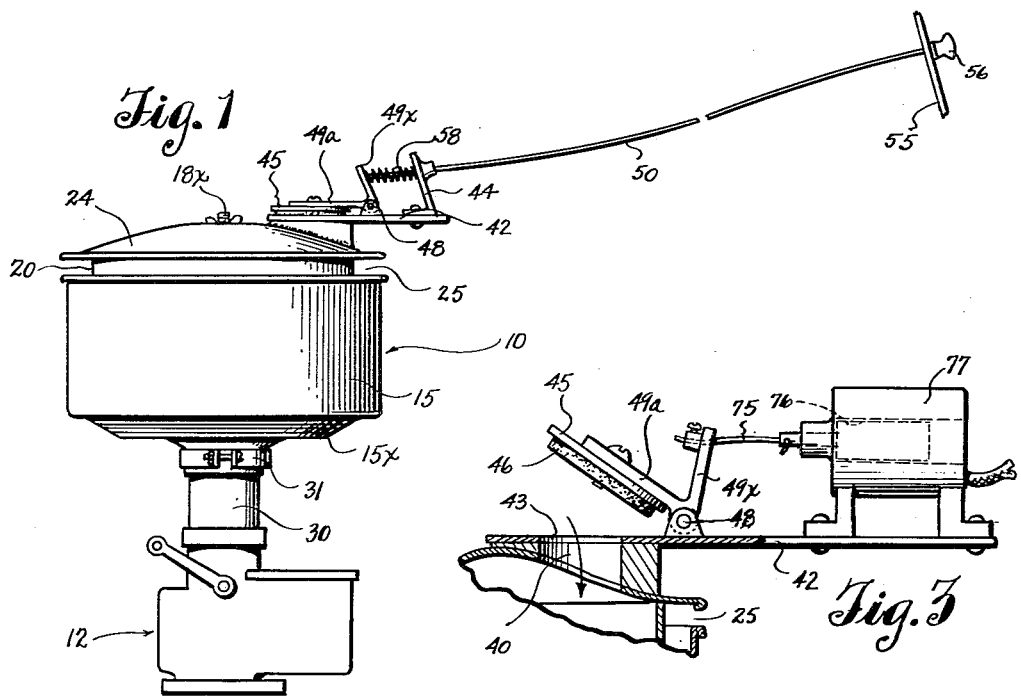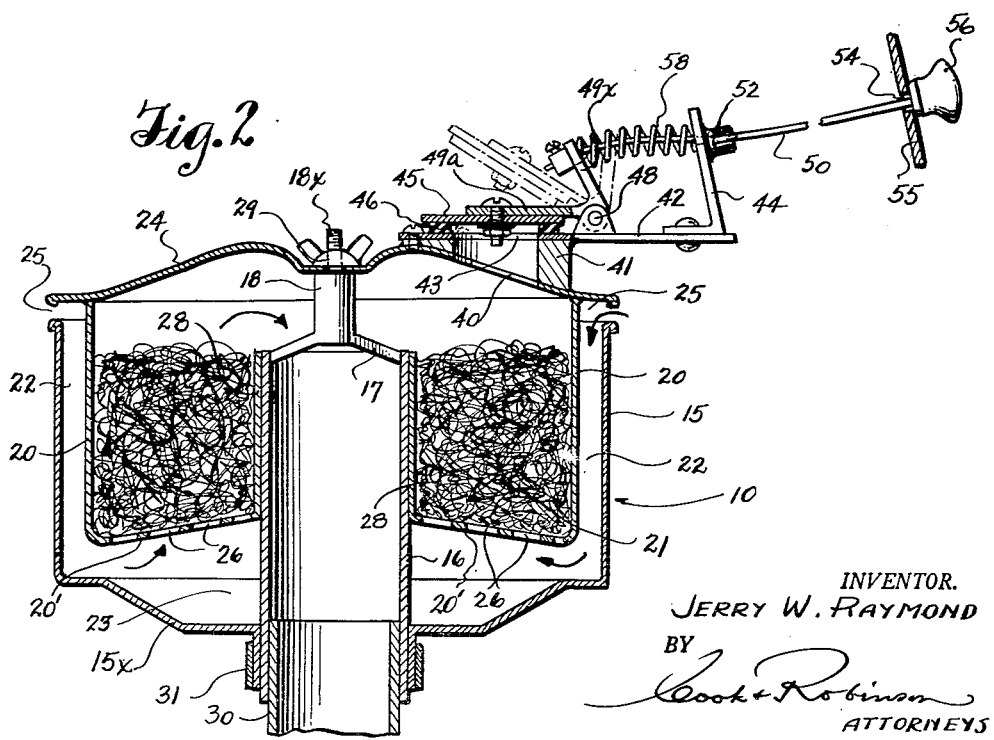

2,766,845

AIR CLEANER

Jerry W. Raymond, Wenatchee, Wash.

Application June 1, 1953, Serial No. 358,660

1 Claim. (Cl. 183—40)

This invention relates to improvements in what are known in the automobile industry as air cleaners, or air strainers, and are used in connection with automobile engines and the like to clean the air that is drawn into the engine's carburetor. More particularly, the present invention resides in the provision, in such air cleaners, of a valve controlled port through which air may be admitted, when such is desired, directly to the air intake side of the carburetor without its being drawn through the air filtering material.

For a better understanding of the reasons for the present invention, it will here be explained that the usual air cleaner has an outlet that is connected directly to the air intake duct of the carburetor that supplies carbureted fuel to the engine. Air that enters the cleaner housing, is drawn by suction that is created in the intake manifold of the engine, through a filtering material that retains the dust and other foreign substances contained in the air. There are certain times when it is desirable that the retarding effect on the inflowing air by the filtering material be eliminated. This is especially true in starting the engine in cold weather. At such a time, an ample supply of air is advantageous. However, in air cleaners as now constructed, the unretarded intaking of air therethrough is not possible and as a consequence, hard starting, flooding and delays result therefrom.

In view of the above, it has been the primary object of the invention to provide an air cleaner or strainer in which a valve controlled auxiliary air inlet port is provided, through which outside air may be admitted in such manner as to by-pass the air filtering material, whatever it may be, and flow directly and uninterruptedly to the intake side of the carburetor.

It is a further object of the present invention to provide for the automatic opening of the control valve for the auxiliary port with the closing of the circuit for the engine's starting motor. Also, to provide means for a manual control of the said valve when such is desired.

In accomplishing these and other objects of the invention, I have provided the improved details of construction, the preferred forms of which are illustrated in the accompanying drawings, wherein:

Fig. 1 is a side view of an air cleaner embodying the improvements of the present invention therein and showing the cleaner as applied to the fuel carburetor of an internal combustion engine; the engine not being shown.

Fig. 2 is an enlarged central section of the air cleaner, illustrating the valve controlled auxiliary air inlet port.

Fig. 3 is a sectional view showing an alterative means for control of the air inlet valve.

Referring more in detail to the drawings:

An air cleaner or strainer of a typical form of construction now extensively used in connection with internal combustion engines of automobiles, is designated in its entirety by reference numeral 10 and it is shown as mounted on and connected with a carburetor 12 of a type now extensively used. Fig. 2 shows the air cleaner 10 to comprise an outer housing 15 of cylindrical or cut-like form, disposed with its axis vertically directed. The housing 15 is open at the top, but is closed at the bottom by a wall 15x that has a central opening within which the lower end portion of an air tube 16 is fitted and secured. The tube 16 extends upwardly and coaxially within the housing 15, terminating short of the level of its top edge. Fixed in the upper end of tube 16 is a spider 17 with an integral, upwardly directed post 18 formed thereon.

Contained coaxially within the housing 15 is a housing 20 of lesser diameter, containing an air filtering or air straining material 21. The housing 20, being of lesser diameter than housing 15, provides an annular passage 22 between them which opens directly into a chamber 23 between the bottoms of the two housings. The upper end of housing 20 extends slightly above the top edge of housing 15 and has an upwardly dished cover member 24 securely fixed thereto, thus to close the top end of that housing. The cover member 24 is substantially of the same diameter as the housing 15 and the housing 20 is so supported within housing 15 that the cover 24 is spaced above the top edge of the housing 15, thus providing an air inlet passage, as at 25, extending entirely about the air cleaner.

The lower end of the housing 20 is closed by a wall 20', and centrally of this wall there is provided a tubular, open guide 28 within which the upper end portions of the tube 16 is contained in a close fit as shown in Fig. 2. The bottom wall 20' of housing 20 is formed with a plurality of air ports 26 through which air can flow to the filtering material. When the housing 20 is disposed within the housing 15, the cover 24 rests upon the post 18 and is fixedly secured by a wing nut 29 threaded onto a stud 18x that extends from the flat upper end surface of post 18 through cover 24.

The lower end of tube 16 extends below the housing 15 and is applied directly to the air intake tube 30 of the carburetor 12 as shown in Fig. 2 and the cleaner is held in place thereon by a clamp band 31 that is tightened about the parts as well shown in Fig. 1.

In the ordinary operation of the engine with which the carburetor is connected, outside air is sucked into the cleaner through the annular passage 25, thence is drawn inwardly through the annular passage 22 and into the chamber 23 immediately below the bottom wall 20' of housing 20, thence is drawn upwardly through ports 26, and through the filtering material 21, thence down through the tubes 16 and 30 leading into the carburetor. In this operation, air flow is somewhat retaarded by reason of the fact that it must pass through a tortuous passage and also be sucked through the filter material. This retarding of the air flow is at times disadvantageous to easy starting of the engine, this being especially true in cold weather. It is for the purpose of eliminating the retarding influence on the air flow that the present improvement which will now be described has been made.

Formed in the top member 24 of the housing 20 is an air port 40 of substantial area, surrounded by an annular base 41 upon which a flat plate 42 is fixed. The plate has a hole 43 therein equal in size and registering with the port 40, and one end portion of the plate extends laterally from the base and at its outer end mounts an upwardly directed bracket 44 thereon for a purpose presently explained.

Hingedly mounted on plate 42, to close over the plate opening 43 is a valve disk 45. This valve disk carries a rubber gasket 46 that is adapted to close in an air tight fit against the plate 42 about the hole 43. The disk is rigidly fixed to one arm 49a of a bell crank lever which, in turn, is mounted on plate 42 by means of a hinge pin as at 48. The other arm, 49x, of the bell crank lever extends upwardly from the hinge point, and as seen in Figs. 1 and 2, has a pull wire 50 attached to its upper end. The wire 50 extends therefrom, slidably through a hole 52 in the bracket 44 and is extended to the engine operators position. For example, it may be extended through an opening 54 in an instrument panel 55, and equipped with a pull knob 56 easily accessable to the vehicle operator. A coiled spring 58 is applied, under compression, about the pull wire between arm 49x and bracket 44, and this operates to normally urge the valve to its closed position. However, by pulling on the wire, the pressure of the spring can be overcome and the valve swung to an open position, as indicated in dotted lines in Fig. 2, thus providing admittance of air through port 40 directly to the upper end of tube 16.

With the auxiliary air port 40 thus provided, it will be understood that, if it is advantageous to do so, the operator of the engine can, at the time of starting the engine with which the air cleaner is used, pull on the wire 50 to open the valve 45, thus admitting an abundance of air directly to the carburetor without the usual retarding effect thereon that results from the intaken air having to be drawn through the air filtering material. Thus, the starting of the engine is made easier, and without danger of carburetor flooding and incident delays.

In Fig. 3, I have shown the lever arm 49x to be connected by a flexible pull cord 75 with the sliding core bar 76 of a solenoid 77. In this arrangement, the solenoid is connected in an electric circuit, and when energized upon closing the circuit, the core bar thereof will be drawn inwardly thus, through the pull cord 75, actuating the valve to its open position. It is further anticipated that if the engine has an electric starter, the solenoid can be connected in series with the starter motor circuit and thus the valve will be automatically opened with the energizing of the starting motor.

It is also anticipated, that in lieu of either the pull wire 50 or electric device, a connection might be made between lever 49x and a vacuum controlled device operated by a suction connection with the suction manifold of the engine with which the device is used.

Air cleaners equipped with an auxiliary, valve controlled air inlet port for direct entry of air can be provided for use in connection with engines as used in tractors and various types of road vehicles other than automobiles and can be made in various sizes to meet requirements.

In the preceeding descriptive matter I have disclosed the cleaning of the intaken air by causing it to be drawn through a filter pad. It is to be understood, however, that the invention anticipates the use of oil or water filters used separately or in conjunction with the filter pads. Therefore, in the claim, the term "air filtering material" shall be considered to include any suitable type or kind of air filtering substance or any material through or against which the air is drawn for cleaning.

It is further to be explained that in lieu of a solenoid for actuating the valve, as shown in Fig. 3, a magnet or other electrically energized device might be employed. Therefore, in the claims the term "electrically energized means" shall be considered to include solenoid, magnet or other electrical device of like character used for this purpose.

It will further be mentioned that aside from the fact that the opening of valve 45 provides for a direct and unretarded admittance of air to the carburetor, the unretarded flow of air further results in a more complete vaporization of gasoline, and this is a further aid to cold weather starting.

Having thus described my invention, what I claim as new therein, and desire to secure by Letters Patent, is:

An air cleaner comprising an outer housing open at the top thereof, a filter housing contained in and spaced from the outer housing, a cover on the filtering housing sealing the top thereof, filtering means in the bottom portion of the filter housing, said filter housing having air ports in its bottom and a chamber in the filter housing above said filtering means, a suction tube leading from said chamber downwardly through said filtering means and the respective bottoms of the outer and filter housings and opening to the air intake of a carburetor, said cover having a normally closed air port opening into said chamber which, when open, permits direct inflow of outside air to the chamber, a horizontal plate secured to and extending from the cover, a valve member hinged to said plate, a lever arm secured to the valve member and extending upwardly therefrom, a bracket on said plate, a spring mounted between the bracket and lever arm for urging the valve to closed position and means attached to said lever arm and extended therefrom for opening the valve.

References Cited in the file of this patent
UNITED STATES PATENTS

| | | |
|---|---|---|
| 1,270,486 | Brown | June 25, 1918 |
| 1,273,565 | Yoder et al. | July 23, 1918 |
| 1,864,201 | Kegerreis et al. | June 21, 1932 |
| 1,929,017 | Davis | Oct. 3, 1933 |
| 2,058,204 | Ball et al. | Oct. 20, 1936 |
| 2,083,649 | Heglar | June 15, 1937 |
| 2,304,829 | Kamrath | Dec. 15, 1942 |